United States Patent
Mironets et al.

(10) Patent No.: US 11,192,296 B2
(45) Date of Patent: Dec. 7, 2021

(54) ADDITIVE MANUFACTURING PROCESS DISTORTION MANAGEMENT

(71) Applicant: United Technologies Corporation, Farmington, CT (US)

(72) Inventors: Sergey Mironets, Charlotte, NC (US); Lexia Kironn, Rocky Hill, CT (US); Joe Ott, Enfield, CT (US); Louis Porretti, Plantsville, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 16/686,951

(22) Filed: Nov. 18, 2019

(65) Prior Publication Data

US 2020/0108444 A1  Apr. 9, 2020

Related U.S. Application Data

(62) Division of application No. 15/109,514, filed as application No. PCT/US2015/010041 on Jan. 2, 2015, now Pat. No. 10,478,892.

(60) Provisional application No. 61/923,070, filed on Jan. 2, 2014.

(51) Int. Cl.
| | |
|---|---|
| *B29C 64/153* | (2017.01) |
| *B29C 64/214* | (2017.01) |
| *B22F 10/20* | (2021.01) |
| *B33Y 10/00* | (2015.01) |
| *B33Y 30/00* | (2015.01) |
| *B33Y 50/02* | (2015.01) |
| *B22F 10/30* | (2021.01) |

(52) U.S. Cl.
CPC ............ *B29C 64/153* (2017.08); *B22F 10/20* (2021.01); *B29C 64/214* (2017.08); *B33Y 10/00* (2014.12); *B33Y 30/00* (2014.12); *B33Y 50/02* (2014.12); *B22F 10/30* (2021.01)

(58) Field of Classification Search
CPC .................................................. B29C 64/153
See application file for complete search history.

(56) References Cited

U.S. PATENT DOCUMENTS

| | | |
|---|---|---|
| 6,621,039 B2 | 9/2003 | Wang |
| 6,723,278 B1 | 4/2004 | Lu |
| 6,782,303 B1 | 8/2004 | Fong |
| 7,135,525 B2 | 11/2006 | Petter |
| 7,148,286 B2 | 12/2006 | Baumann |
| 7,467,939 B2 | 12/2008 | Sperry |

(Continued)

FOREIGN PATENT DOCUMENTS

| | | |
|---|---|---|
| WO | 2008120516 A1 | 10/2008 |
| WO | 2012097799 A2 | 7/2012 |

*Primary Examiner* — Larry W Thrower
(74) *Attorney, Agent, or Firm* — Getz Balich LLC

(57) ABSTRACT

A method is provided for additive manufacturing. This method includes monitoring a current to a recoater blade. The monitored current is compared to a predetermined current. An operation is initiated in response to the monitored current exceeding the predetermined current. Another method for additive manufacturing includes comparing a movement of a recoater blade to an expected movement. A single exposure sequence is initiated in response to movement of the recoater blade being different than an expected movement. An additive manufacturing system is also provided which includes a recoated blade and a control. The control is operable to identify resistance to movement of the recoater blade.

17 Claims, 2 Drawing Sheets

(56) References Cited

U.S. PATENT DOCUMENTS

| | | |
|---|---|---|
| 7,614,866 B2 | 11/2009 | Sperry |
| 7,636,610 B2 | 12/2009 | Schillen |
| 7,708,929 B2 | 5/2010 | Monsheimer |
| 7,887,740 B2 | 2/2011 | Simon |
| 8,003,040 B2 | 8/2011 | El-Siblani |
| 8,052,743 B2 | 11/2011 | Weber |
| 8,105,527 B2 | 1/2012 | Wahlstrom |
| 8,110,135 B2 | 2/2012 | El-Siblani |
| 8,173,258 B2 | 5/2012 | Monsheimer |
| 2015/0041025 A1 | 2/2015 | Wescott |
| 2015/0115490 A1 | 4/2015 | Reinarz |

ADDITIVE MANUFACTURING PROCESS DISTORTION MANAGEMENT

CROSS-REFERENCE TO RELATED APPLICATION

This application is a divisional of U.S. patent application Ser. No. 15/109,514 filed Jul. 1, 2016, which is a national stage application of PCT Patent Application No. PCT/US2015/010041 filed Jan. 2, 2015, which claims priority to U.S. Provisional Patent Application No. 61/923,070 filed Jan. 2, 2014, which are hereby incorporated herein by reference in their entireties.

BACKGROUND

The present disclosure relates generally to a method and apparatus for additive manufacturing and, more particularly, to a method and apparatus for a current load monitoring algorithm that provides a quantitative evaluation of component distortion due to residual thermal stresses.

Laser Powder Bed Fusion (LPBF) is an additive manufacturing process involving construction of a three-dimensional article by selectively projecting a laser beam having a desired energy onto a layer of particles. When coupled with computer aided design apparatus, LPBF is an effective technique for producing prototype as well as mainstream production articles. Other such additive manufacturing processes utilize an electron beam within a vacuum.

An LPBF system utilizes a rigid recoater blade system for high precision deposition of micron level powder layers that may be adjusted by material and a desired compromise between speed and surface finish. Although effective, the rigid recoater blade system may be subject to thermal stresses that cause distortions especially in relatively thin wall components with high aspect ratios. Oxygen content variation influences the absorption rate of laser radiation, which changes melt pool formation and liquid metal surface tension. These and other factors may negatively impact a fusion process between adjacent scanning paths and deposited layers which may often cause excessive volumetric growth of rapidly solidified material such that the rigid recoater blade may jam on the distorted areas of the fused layer and cause a process interruption.

SUMMARY

A method of additive manufacturing, according to one disclosed non-limiting embodiment of the present disclosure, includes monitoring a current to a recoater blade. The monitored current is compared to a predetermined current. An operation is initiated in response to the monitored current exceeding the predetermined current.

In a further embodiment of the present disclosure, the operation is a single exposure sequence.

In a further embodiment of any of the foregoing embodiments of the present disclosure, the single exposure sequence operates a laser.

In a further embodiment of any of the foregoing embodiments of the present disclosure, the single exposure sequence restrains movement of the recoater blade.

In a further embodiment of any of the foregoing embodiments of the present disclosure, the operation is an ultrasonic impact treatment.

In a further embodiment of any of the foregoing embodiments of the present disclosure, the method also includes identifying where the monitored current exceeds the predetermined current.

In a further embodiment of any of the foregoing embodiments of the present disclosure, the single exposure sequence operates an electron beam.

A method of additive manufacturing, according to another disclosed non-limiting embodiment of the present disclosure, includes comparing a movement of a recoater blade to an expected movement. A single exposure sequence is initiated in response to movement of the recoater blade being different than an expected movement.

In a further embodiment of any of the foregoing embodiments of the present disclosure, the single exposure sequence restrains movement of the recoater blade.

In a further embodiment of any of the foregoing embodiments of the present disclosure, the single exposure sequence operates a laser.

In a further embodiment of any of the foregoing embodiments of the present disclosure, the single exposure sequence operates an electron beam.

In a further embodiment of any of the foregoing embodiments of the present disclosure, the method also includes identifying where the monitored current exceeds the predetermined current.

An additive manufacturing system, according to another disclosed non-limiting embodiment of the present disclosure, includes a recoated blade and a control. The control is operable to identify resistance to movement of the recoater blade.

In a further embodiment of any of the foregoing embodiments of the present disclosure, the control is operable to identify resistance to movement of the recoater blade through monitoring of a current to the recoater blade.

In a further embodiment of any of the foregoing embodiments of the present disclosure, the control is operable to initiate an operation in response to identification of a threshold current.

In a further embodiment of any of the foregoing embodiments of the present disclosure, the control is operable to initiate a single exposure operation in response to identification of a threshold current.

In a further embodiment of any of the foregoing embodiments of the present disclosure, the single exposure operation is operable to restrain movement of the recoater blade.

In a further embodiment of any of the foregoing embodiments of the present disclosure, the single exposure operation is operable to activate a laser.

In a further embodiment of any of the foregoing embodiments of the present disclosure, the single exposure sequence operates an electron beam.

In a further embodiment of any of the foregoing embodiments of the present disclosure, the control is operable to identify a location of the resistance to movement of the recoater blade.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
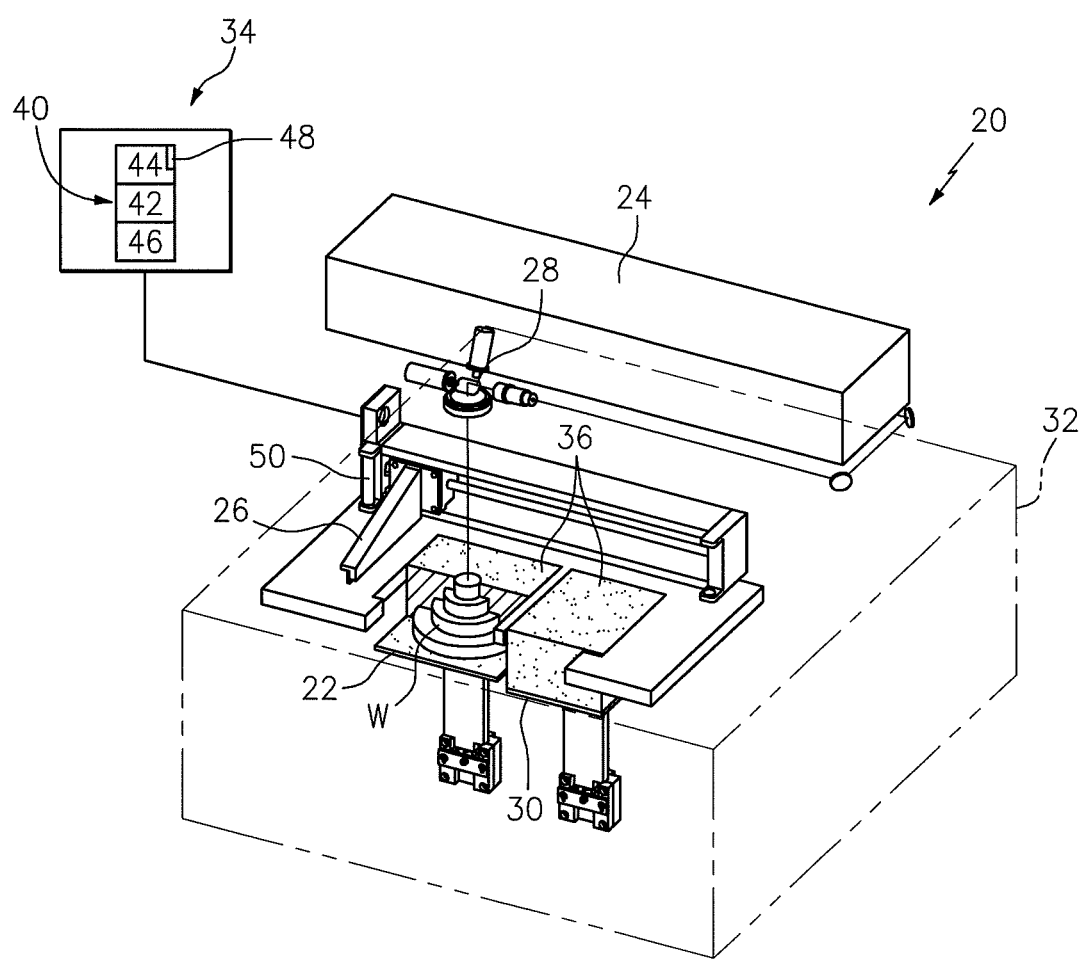
FIG. 1 is a schematic perspective illustration of an example additive manufacturing system.

FIG. 1 schematically illustrates an additive manufacturing system 20. Example additive manufacturing systems 20 include, but are not limited to, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Direct Metal Laser Sintering (DMLS) and others. The system 20 generally includes a build platform 22, a laser 24, a rigid recoater blade system 26, a scanner head 28, a dispenser platform 30, a build chamber 32 and a control 34. It should be appreciated that various components and subsystems may additionally or alternatively provided.

The additive manufacturing process facilitates manufacture of relatively complex components, minimize assembly details and minimize multi-component construction. The additive manufacturing process essentially "grows" articles from three-dimensional information such as, for example, a three-dimensional computer aided design (CAD) model. The three-dimensional information is converted into a plurality of slices. Each of these slices defines a cross section of the article for a predetermined height of the slice. The additive manufactured component is then "grown" slice by slice, or layer by layer, until finished.

The build platform 22 and the dispenser platform 30 are contained within the build chamber 32 that is closed hermetically to receive an inert gas to avoid unwanted reactions of a melt bath from a stock of powder 36 as well as a window through which the laser beam from the laser 24 may pass to selectively form the melt bath. An example laser 24 includes a $CO_2$ laser that can operate in a continuous mode at a wavelength of approximately 10590 nm, which is infrared. The laser 24 is selectively modulated to produce a laser beam. The output power can also be modulated with a selectable range of, for example, zero (0) to two-hundred (200) watts. The laser 24 is selectively controlled via the control 34 and in accordance with a CAD file containing detailed dimensions of the desired article and its associated cross-sections.

The scanner head 28 is mounted along the path of travel of the laser beam to focus and redirect the laser beam into the build chamber 32 to trace the associated cross-sections of the desired article. The scanner head 28 may include a pair of mirrors driven by respective galvanometers in response to the control 34 in accordance with the CAD file that contains detailed dimensions of the desired article and its associated cross-sections.

The build chamber 32 is where growth of the article occurs. The internal surface of the build chamber 32 may be manufactured of a stainless steel, covered by thermal insulation material, and include the window that allows the laser beam to pass therethrough and to scan on the target area of the build platform 22.

The build platform 22 may be lowered and the dispenser platform 30 raised so that the article W is produced in the stock of powder 36 from the dispenser platform 30, while, in each case after a layer of the article W has been produced by the laser 24, the build platform 22 is lowered by the layer thickness. Alternatively, the laser 24 and the recoater blade 26 are raised with respect to the component while the build platform 22 remains fixed. It should be understood that various combinations thereof may be provided to facilitate manufacture.

In general, operation according to one disclosed non-limiting embodiment distributes powder to the build platform 22 from the dispenser platform 30 by the recoater blade 26 in response to the control 34. The build-up or "growth" of the article W is directly in a layer-by-layer manner. That is, a computer file of the article W is sliced into discrete layers having a certain thickness, which cumulatively comprise the three-dimensional configuration of the article W. Each layer includes a two-dimensional cross-sectional contour of the article W.

The control 34 generally includes a control module 40 with a processor 42, a memory 44, and an interface 46. The processor 42 may be any type of microprocessor having desired performance characteristics. The memory 44 may include any type of computer readable medium which stores the data and control algorithms described herein such as a current load monitoring algorithm 48. The functions of the algorithm 48 are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment. Other operational software for the processor 42 may also be stored in the memory 44 to provide both manual and automatic Programmable Logic Controller (PLC) inputs. The interface 46 facilitates communication with other subsystems such as a step motor 50 of the rigid recoater blade system 26. It should be appreciated that the control 34 may be centralized or distributed. It should also be appreciated that various control inputs may be alternatively or additionally provided.

The rigid recoater blade system 26 is driven by the step motor 50 to sweep and spread a portion of the powder on the build platform 22 from the raised dispenser platform 30. Corresponding to the first cross-sectional region of the article W, the control 34 controls the laser beam to selectively scan the deposited powder within the confines of the defined boundaries of that layer. The laser beam heats the powder so as to melt, and the powder is joined together for that layer.

After the laser 24 has processed each layer, the recoater blade 26 again distributes fresh material powder onto the build platform 22 from the raised dispenser platform 30 and over the partially grown article W, which may be lowered so as to correspond to the layer thickness that is to be next applied. That is, the rigid recoater blade system 26 can move back and forth to deliver the powder from the dispenser platform 30 to the build platform 22 and level the powder surface.

Figure 2:
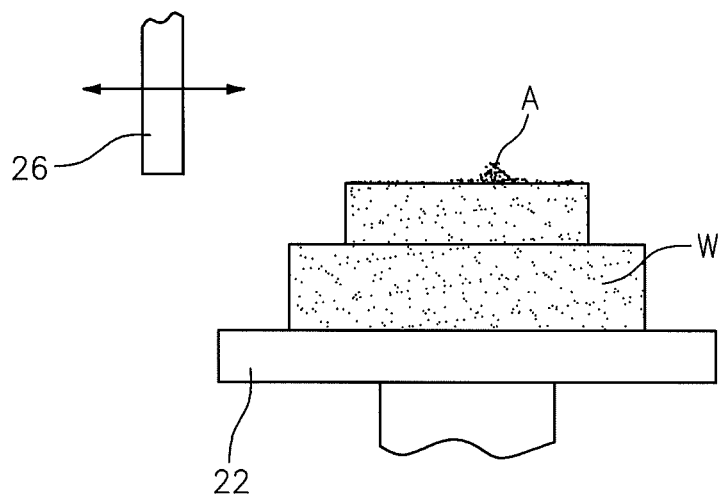
FIG. 2 is a schematic cross-section of an additively manufactured article with an irregularity.

The layer that has been processed by the laser 24, however, may not be completely smooth and in some cases may include an irregularity A greater in height than the layer thickness to be next applied (see FIG. 2). At such area(s), the recoater blade 26 essentially grinds over the layer that was last processed to facilitate continuation of the process. The recoater blade 26, however, may sometimes jam on the irregularity A.

The electric step motor 50 powers movement of the recoater blade 26 in response to the control 34. During the powder layer deposition, the current load of the motor 50 changes in response to the resistance between the recoater blade 26 and any surface irregularity of the previously deposited layers such as the irregularity A. When the recoater blade 26 moves over the irregularity A, a relatively higher current load results to overcome the resistance. The motor current load is monitored throughout the entire build and synchronized with the system software to determine the exact location of the irregularity A at each layer. That is, the current to the electric step motor 50 is utilized in this disclosed non-limiting embodiment to compare movement of the recoater blade 26 to an expected movement and initiate an operation in response to movement of the recoater blade 26 being different than the expected movement.

If the current load exceeds an established limit, a single exposure sequence can be initiated automatically without process interruption. As defined herein the "single exposure sequence" again laser processes the current layer without depositing a next layer of powder. The single exposure sequence thereby levels out the distorted area. Then, the next layer of powder will be deposited and the process will continue.

The single exposure sequence is particularly effective as the oxygen content inside the build chamber 32 remains at the same level because the oxygen level is maintained below an acceptable threshold. The inert gas such as argon may flow or hold to maintain the relative oxygen level below an acceptable threshold. That is, the single exposure sequence occurs immediately subsequent to the resistance between the recoater blade 26 and any surface irregularity of the previously deposited layers. For an electron beam (EBM) system, the sintering is performed in a vacuum.

Other operations such as ultrasonic impact treatment can alternatively or additionally be utilized for in-process stress relief in response to the resistance between the recoater blade 26 and any surface irregularity of the previously deposited layers.

Figure 3:
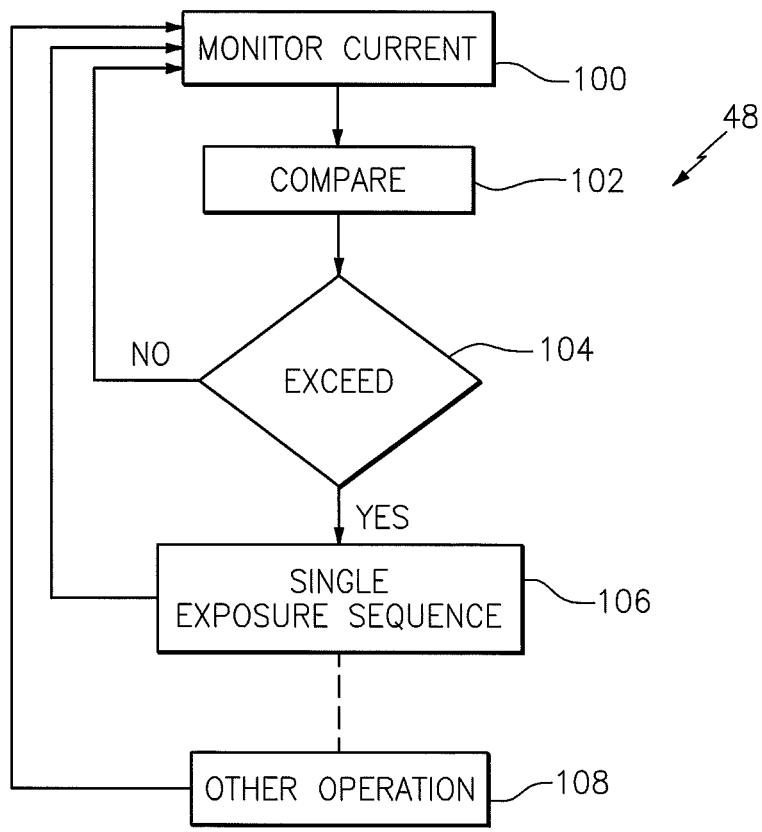
FIG. 3 is a flow chart illustrating operating of an additive manufacturing process.

With reference to FIG. 3, in operation, the current load monitoring algorithm 48 operates to process each layer of the component while monitoring the current to the recoater blade 26 (step 100). The monitored current is compared to a predetermined current (step 102). Should the monitored current exceed a threshold as defined by the predetermined current (Step 104), the current load monitoring algorithm 48 initiates a single exposure sequence (step 106). Additionally, the current load monitoring algorithm 48 may specific identify where the monitored current exceeds the threshold as defined by the predetermined current to initiate another operation such as, but not limited to, an ultrasonic impact treatment (step 108).

It should be appreciated that the monitored current may be analyzed and utilized for various alternative operations. For example, the component may be built in various build orientations, e.g., top up, side up, etc., until the lowest monitored current is determined such that full production build will most efficiently proceed at that orientation.

The current load monitoring algorithm 48 facilitates quality assurance (process repeatability for multiple builds with the same article orientation and support structure generation; early problem detection (blade wear, powder quality deterioration, plate alignment problems, recoater mechanism malfunction, etc.)) and maintenance scheduling; evaluating different build orientations and finding the optimum orientation based on the minimum current load; enable uninterrupted build of an extremely complex shapes utilizing a "Single Exposure" option; estimating a starting point for additional Support Structure to minimize the excessive current load when build proceeds through the distorted areas. The current load monitoring algorithm thereby provides a quantitative evaluation of component distortion due to residual thermal stresses and will provide more robust process control.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of additive manufacturing, comprising:
    comparing a movement of a recoater blade to an expected movement; and
    initiating a single exposure sequence and an impact treatment in response to movement of the recoater blade being different than an expected movement.

2. The method as recited in claim 1, wherein the single exposure sequence restrains movement of the recoater blade.

3. The method as recited in claim 2, wherein the single exposure sequence operates a laser.

4. The method as recited in claim 2, wherein the single exposure sequence operates an electron beam.

5. The method as recited in claim 1, further comprising:
monitoring a current to the recoater blade to provide a monitored current;
comparing the monitored current to a predetermined current; and
identifying where the monitored current exceeds the predetermined current.

6. The method as recited in claim 5, wherein the initiating the single exposure sequence and the impact treatment comprises initiating the single exposure sequence and the impact treatment where the monitored current is identified as exceeding the predetermined current.

7. The method as recited in claim 1, further comprising identifying a location of resistance to the movement of the recoater blade.

8. The method as recited in claim 1, wherein the impact treatment comprises an ultrasonic impact treatment.

9. A method of additive manufacturing, comprising:
comparing a movement of a recoater blade to an expected movement; and
initiating an impact treatment in response to movement of the recoater blade being different than an expected movement.

10. The method of claim 9, wherein the impact treatment comprises an ultrasonic impact treatment.

11. The method of claim 9, further comprising initiating a single exposure sequence in response to the movement of the recoater blade being different than the expected movement.

12. The method of claim 11, wherein the single exposure sequence restrains movement of the recoater blade.

13. The method of claim 11, wherein the single exposure sequence operates a laser.

14. The method of claim 11, wherein the single exposure sequence operates an electron beam.

15. The method of claim 9, further comprising:
monitoring a current to the recoater blade to provide a monitored current;
comparing the monitored current to a predetermined current; and
identifying where the monitored current exceeds the predetermined current.

16. The method of claim 15, wherein the initiating the impact treatment comprises initiating the impact treatment where the monitored current is identified as exceeding the predetermined current.

17. The method of claim 9, further comprising identifying a location of resistance to the movement of the recoater blade.

* * * * *